United States Patent [19]
Alexander et al.

[11] Patent Number: 5,709,518
[45] Date of Patent: Jan. 20, 1998

[54] AUTOMATIC WHEEL CHOCK SYSTEM

[75] Inventors: James C. Alexander, London; Robert C. Hersey, St. Thomas, both of Canada

[73] Assignee: United Dominion Industries, Charlott, N.C.

[21] Appl. No.: 562,957

[22] Filed: Nov. 27, 1995

[51] Int. Cl.$^6$ ............................................ B65G 67/02
[52] U.S. Cl. .................................... 414/401; 414/584
[58] Field of Search .............................. 414/396, 401, 414/402, 584; 188/32; 410/30

[56] References Cited

U.S. PATENT DOCUMENTS

| | | | |
|---|---|---|---|
| 2,413,744 | 1/1947 | Carter | 280/179 |
| 2,661,505 | 12/1953 | Dilione . | |
| 2,773,564 | 12/1956 | Garard, Sr. | 188/32 |
| 3,157,249 | 11/1964 | Laverone et al. | 188/32 |
| 3,221,907 | 12/1965 | O'Sullivan | 214/42 |
| 3,305,049 | 2/1967 | Willey . | |
| 3,447,639 | 6/1969 | Parr | 188/32 |
| 3,542,157 | 11/1970 | Noah | 188/32 |
| 3,666,118 | 5/1972 | Raynes et al. | 214/38 B |
| 4,122,629 | 10/1978 | Rennick | 49/357 |
| 4,207,019 | 6/1980 | Cone | 414/373 |
| 4,555,211 | 11/1985 | Metz | 414/401 |
| 4,674,929 | 6/1987 | Blunden | 410/30 |
| 4,676,344 | 6/1987 | Locicero | 188/32 |
| 4,765,792 | 8/1988 | Cherry et al. | 414/401 |
| 4,969,792 | 11/1990 | Ellis | 414/401 |
| 5,071,306 | 12/1991 | Alexander | 414/401 |
| 5,120,181 | 6/1992 | Alexander | 414/401 |
| 5,249,905 | 10/1993 | Warner | 414/401 |
| 5,375,965 | 12/1994 | Springer et al. | 414/401 X |
| 5,531,557 | 7/1996 | Springer | 414/401 |
| 5,553,987 | 9/1996 | Ellis | 414/401 |
| 5,582,498 | 12/1996 | Springer et al. | 414/401 |

FOREIGN PATENT DOCUMENTS

| | | |
|---|---|---|
| 0284532 | 9/1988 | European Pat. Off. ............. 410/30 |
| 0384850 | 8/1990 | European Pat. Off. . |
| 0537075 A1 | 4/1993 | European Pat. Off. . |
| 2652340 | 3/1991 | France ........................... 414/401 |
| 2735826 | 2/1979 | Germany . |
| 44 27 406 | 10/1995 | Germany . |
| WO/95/18029 | 7/1995 | WIPO . |

OTHER PUBLICATIONS

"Load and Unload Safely with the Dyna Seal Wheelblocker" (brochure).

*Primary Examiner*—James W. Keenan
*Attorney, Agent, or Firm*—Sughrue, Mion, Zinn, Macpeak & Seas, PLLC

[57] ABSTRACT

A chocking device for securing a vehicle at a loading dock having a guide rail mountable to a driveway and a carriage movable on the guide rail. A drive mechanism, which may be hydraulic or electric is employed to advance said carriage from a stored position to a position proximate to a wheel of the vehicle. A chock assembly is pivotedly mounted on the carriage and is movable by the drive mechanism from a retracted position to an engaging position. In one embodiment the chock assembly comprises an arm having a sensor bar to contact one portion of the wheel and a chock plate movable in response to contact of the sensor bar against the wheel to contact another portion of the wheel and block movement of the vehicle. A lock assembly is mounted on the guide rail for movement thereon, and is moved by the drive mechanism into contact with the chock plate to restrain the chock plate in the extended position. In another embodiment of the locking device, a leadscrew advances the chock plate and by sensing the load the power is terminated when the plate is firmly in contact with the wheel.

19 Claims, 14 Drawing Sheets

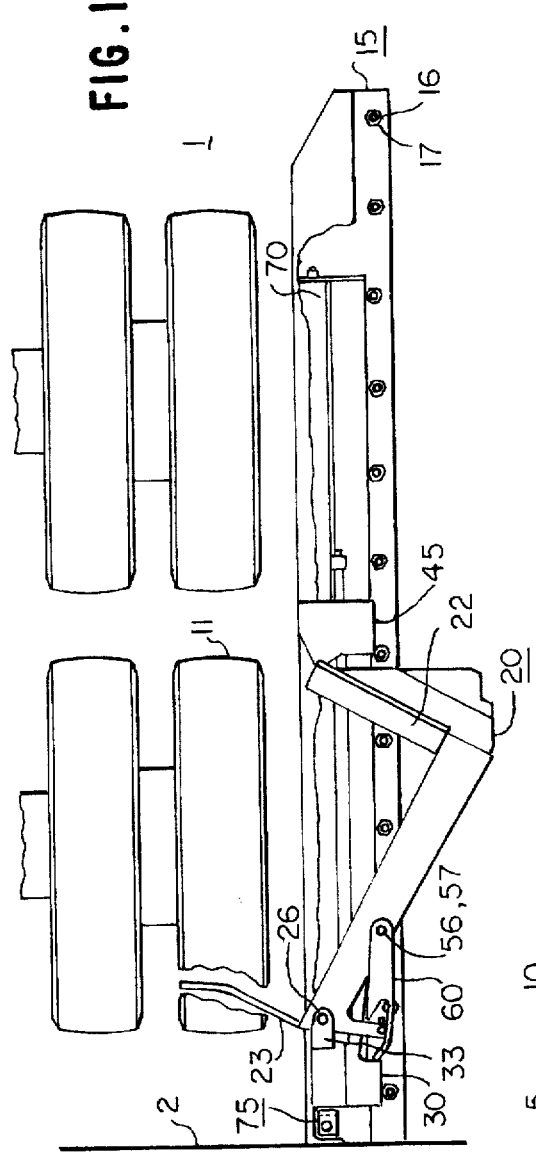
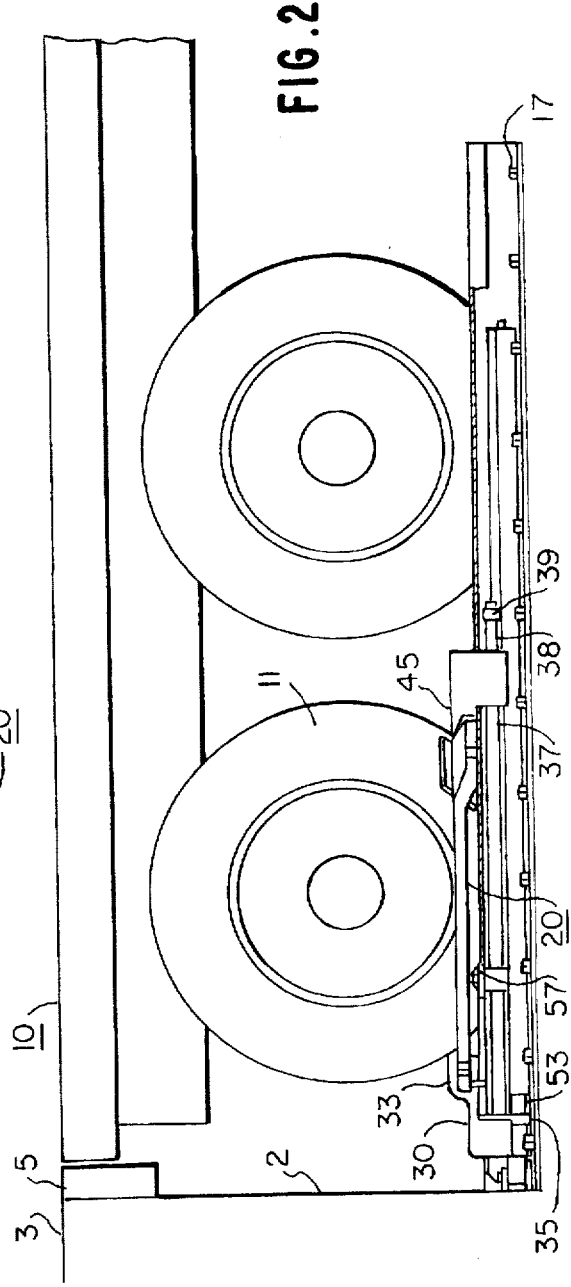

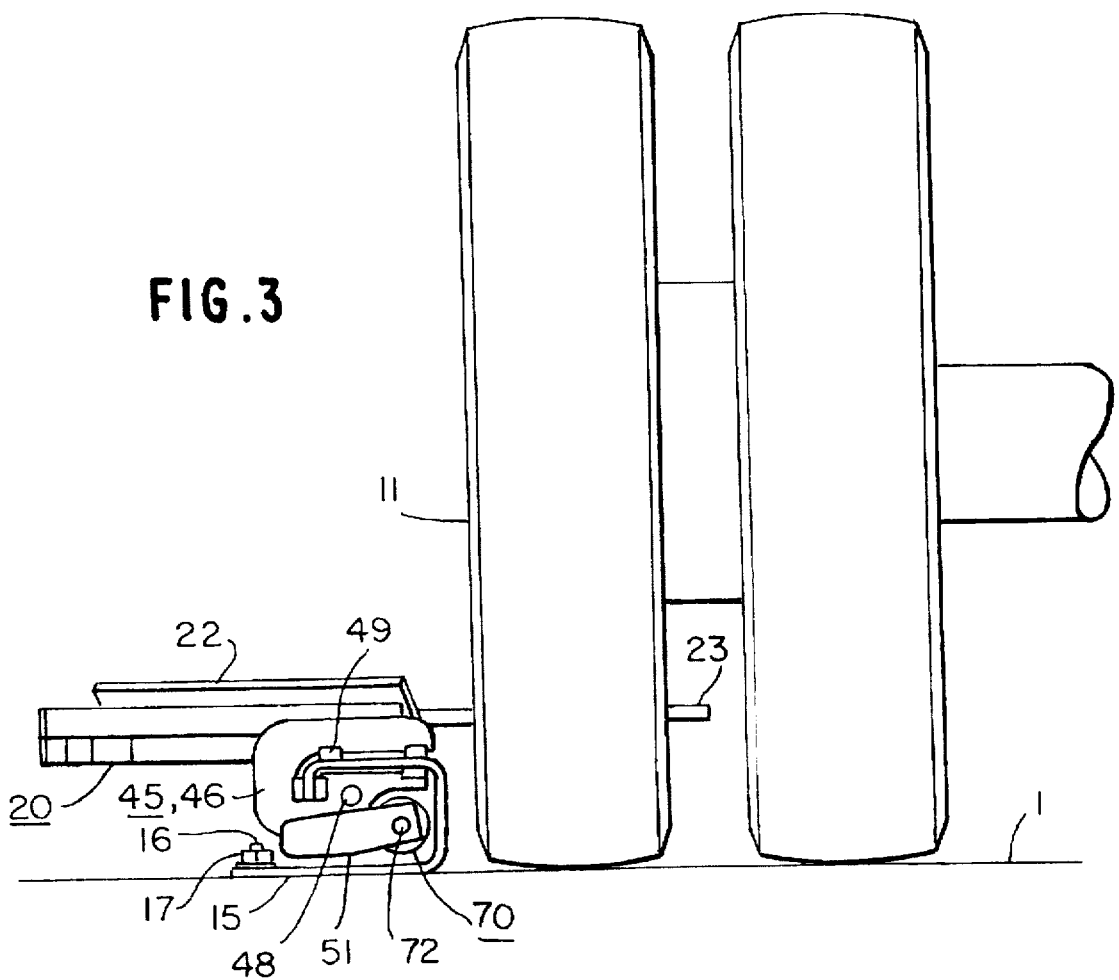
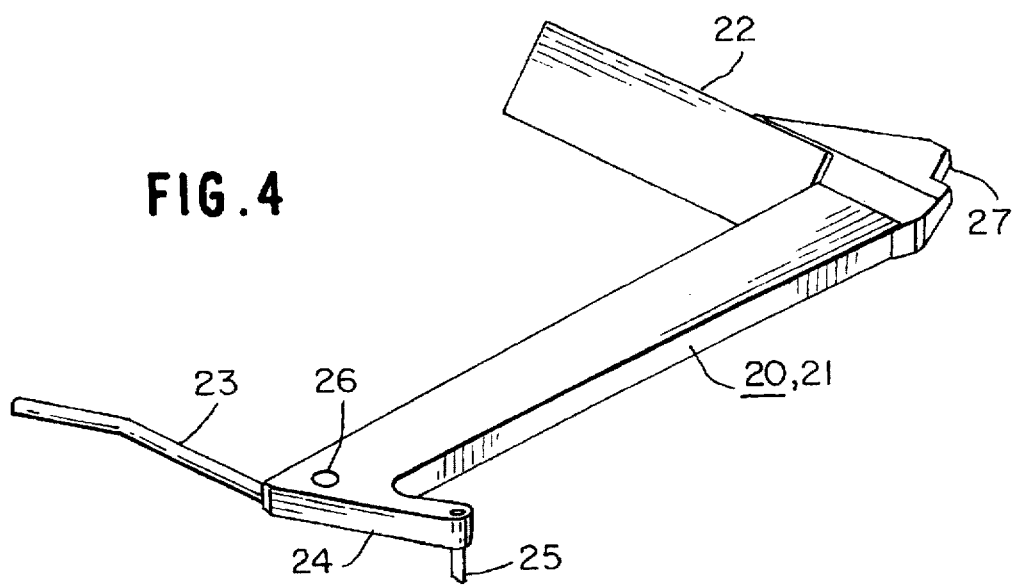

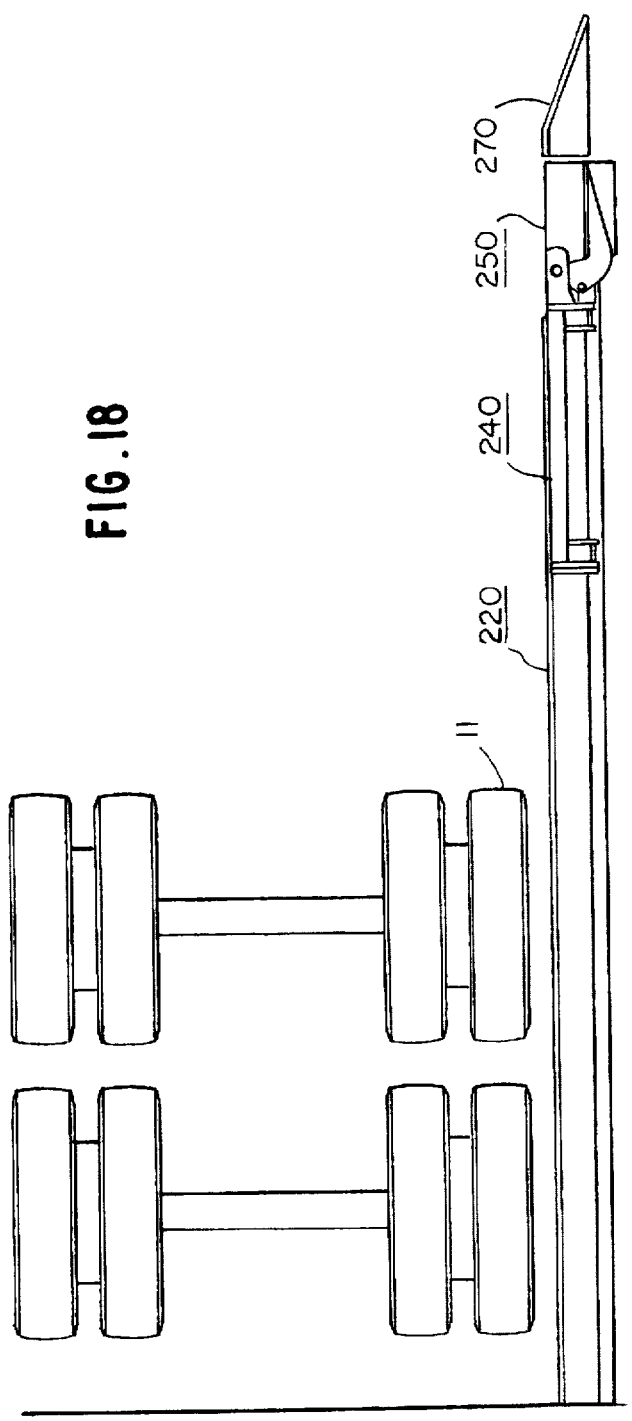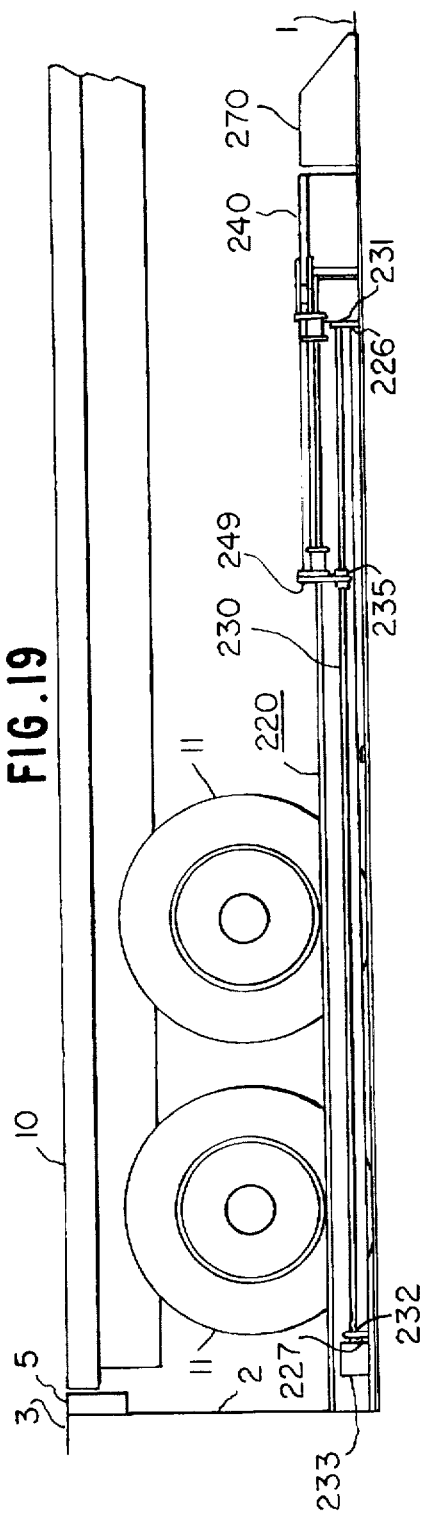

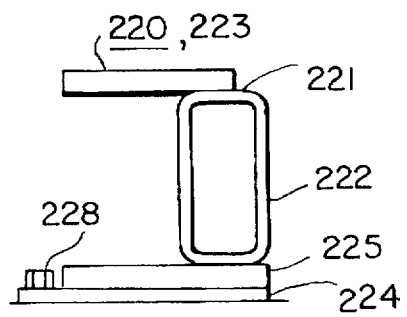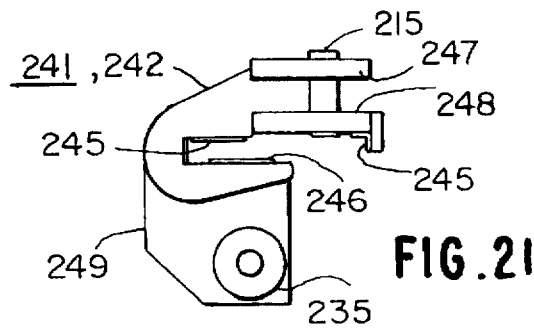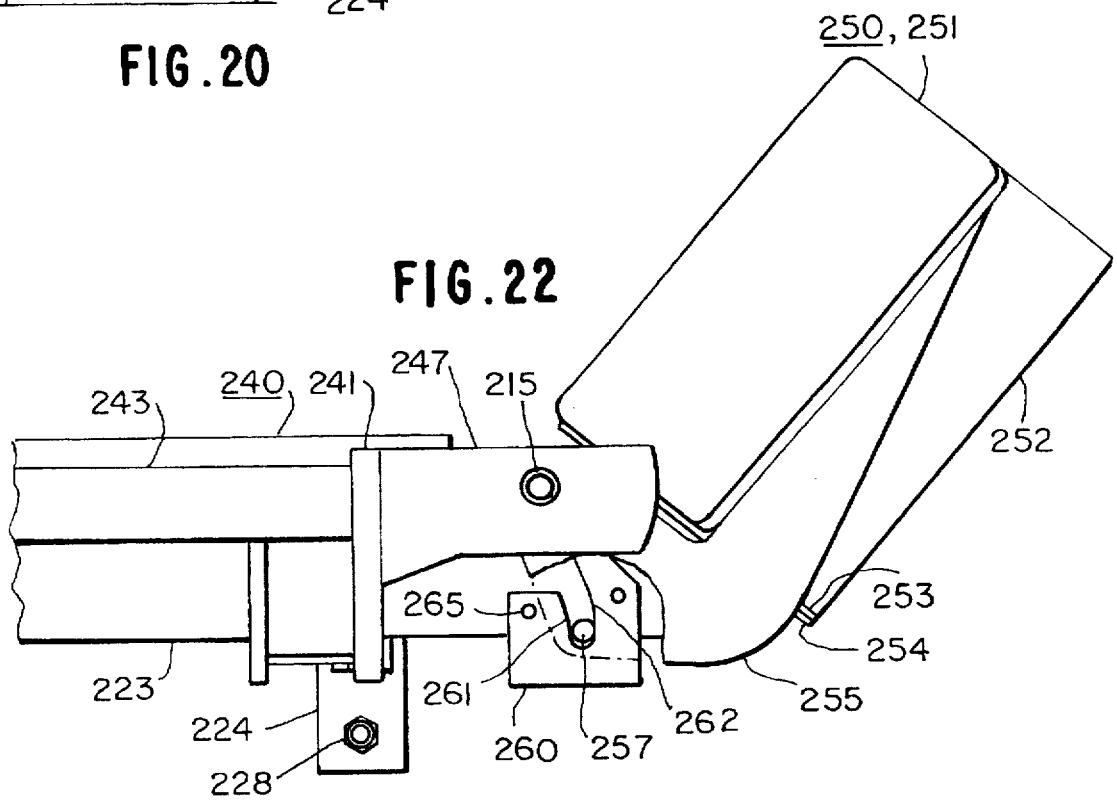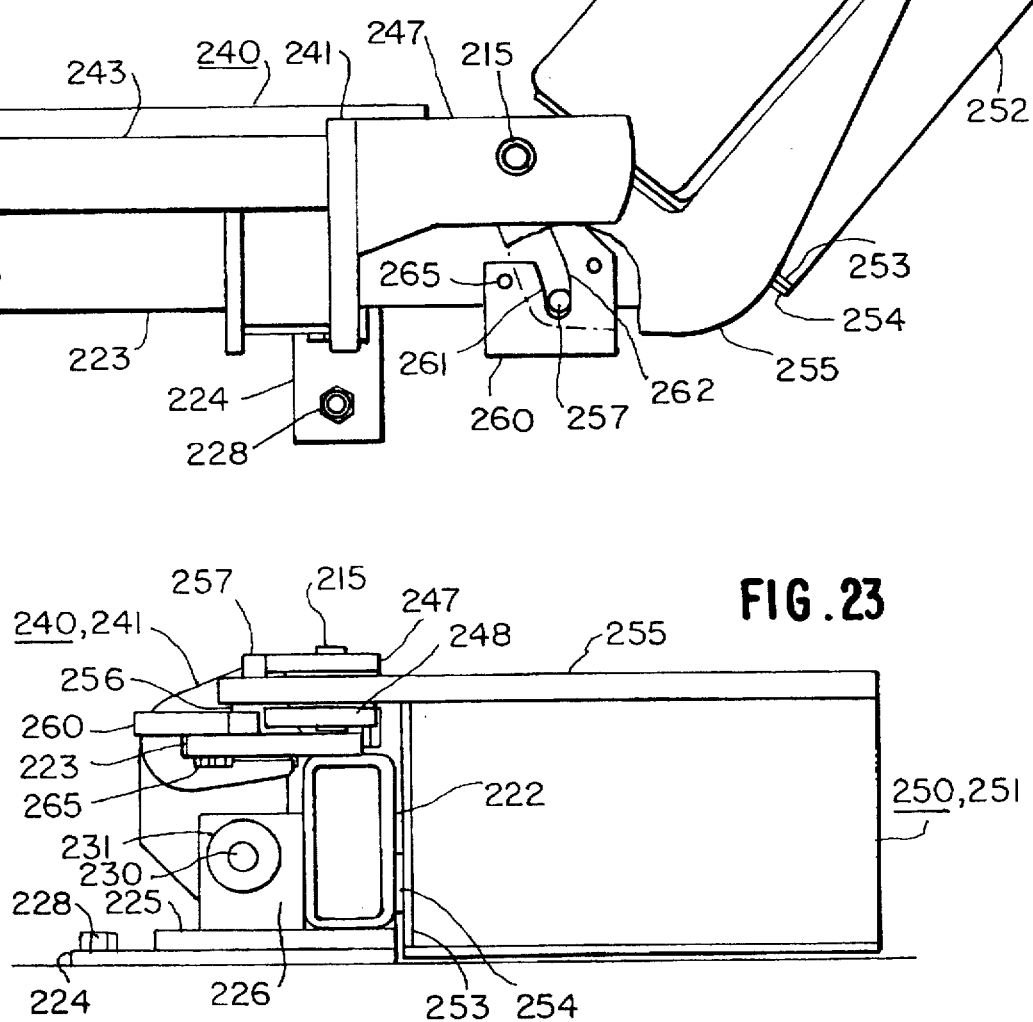

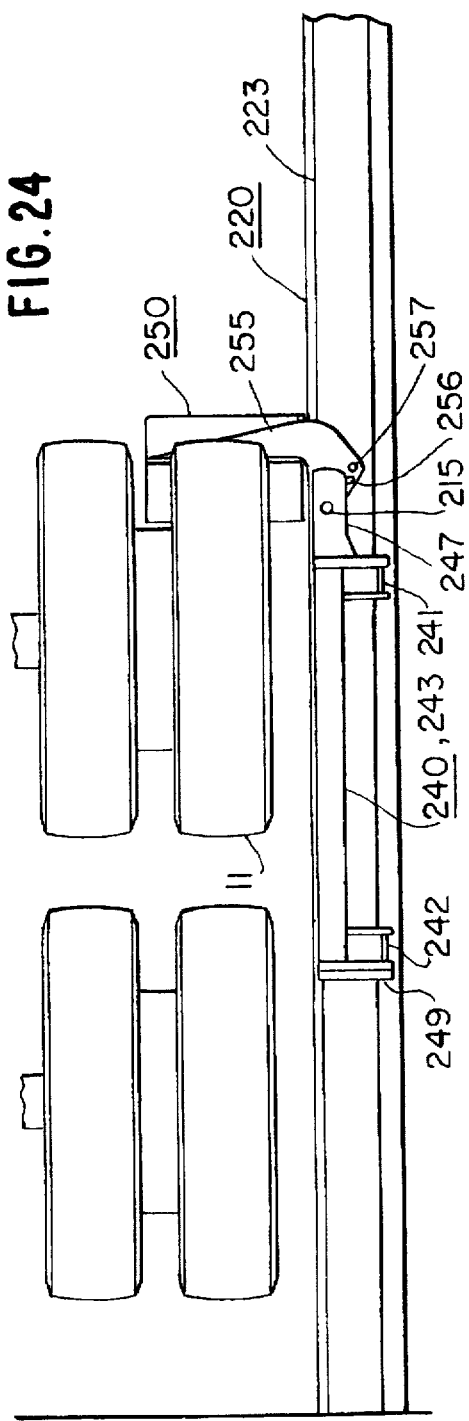
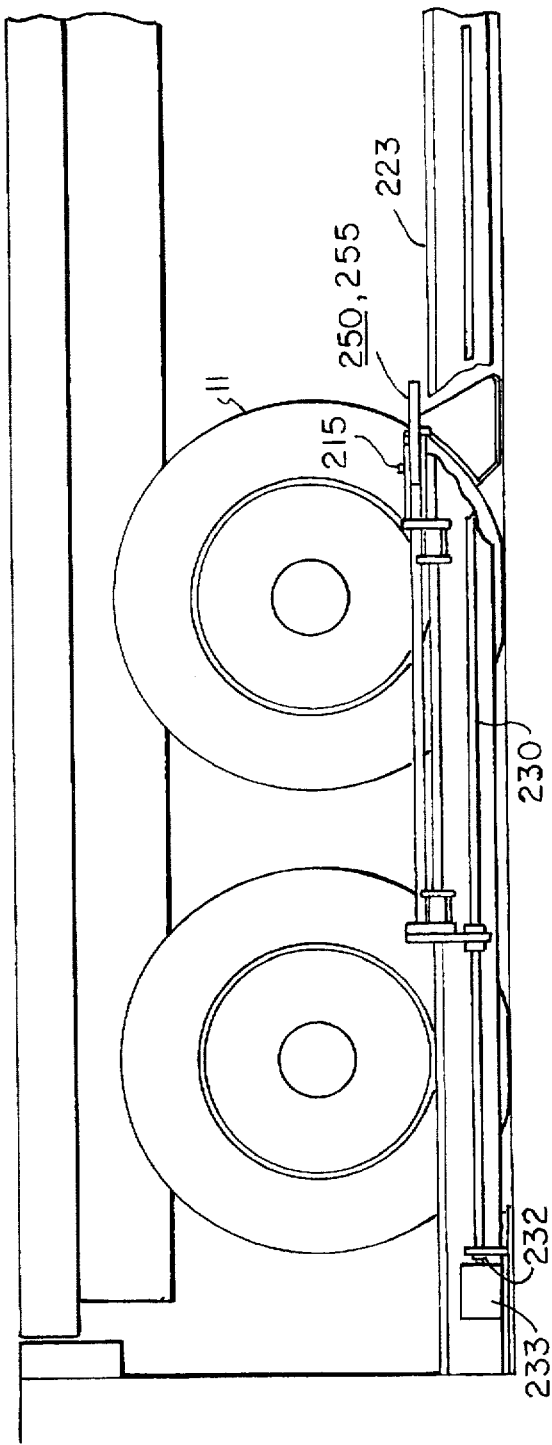

AUTOMATIC WHEEL CHOCK SYSTEM

BACKGROUND OF THE INVENTION

1. Field of the Invention

This invention is related to material handling equipment and in particular to mechanical devices that restrain a vehicle at a loading dock.

2. Prior Art

Devices that restrain a vehicle against movement away from loading docks are known and widely used. They range from simple wheel chocks to complicated mechanical systems. Mechanical vehicle restraints generally fall into two broad categories, those which restrain by latching on to an abutment of the vehicle, usually the ICC bar and, those which engage a wheel.

Examples of the first type are found in U.S. Pat. Nos. 4,555,211; 5,071,306 and 5,120,181. These patents are representative of a variety of devices wall or approach mounted that move hooks or barriers into position to contact the ICC bar and thus prevent movement away from the loading dock. Such devices have achieved commercial success and are generally effective. They however suffer from operational limitations because of the differences in location and geometry of the target, i.e. the ICC bar. These limitations include failure to engage in some situations, trailer creep and locking up thus preventing the truck from moving out once the loading operation is complete.

Examples of the second type (wheel chocks) are found in U.S. Pat. Nos. 2,661,505; 3,305,049; 4,207,019; 4,969,792 and 5,249,905 which show chocking devices which store in the driveway and move toward the wheel to engage and hold the vehicle. These patents represent techniques to automatically place a chock in front of a wheel to prevent a vehicle from moving away from a loading dock, but most have significant limitations. The device shown by Willey in U.S. Pat. No. 3,305,049 is simple in concept, but the screw element shown is exposed to impact and could not withstand the lateral and bending forces exerted by the block 17. The device shown by Cone in U.S. Pat. No. 4,207,019 occupies space under the rear of the vehicle and could prevent the lowering of a hydraulic tail gate. The device shown by Warner et al in U.S. Pat. No. 5,249,905 provides effective wheel chocking but requires expensive excavation for installation. Also, proper drainage must be provided and heating elements may be required in colder climates.

Some of these devices have also achieved commercial use but still have serious technical/operational problems. The advantages of this class of vehicle restraint however are that positive engagement with a wheel occurs this insuring reliability and minimum trailer creep. Nevertheless, these devices tend to be more complex than those restraints which engage the ICC bar and in some situations require expensive installations such as trenching and the like. Also, they are susceptible to mis-position relative to the wheel if the vehicle is not aligned on the approach correctly, i.e. off center or angled.

One limitation common to most automatic wheel chocking devices is that they usually travel through a greater distance and therefore require a much longer time to engage than devices which hook on to the ICC bar. The position of the wheels relative to the rear of a vehicle can vary by many feet. Therefore the chock must be able to travel through a long distance to ensure that it can engage the wheels of a variety of vehicles. Usually the chock must overcome a relatively low force to travel from the stored position to engage the wheel, and then must exert a significantly higher force against the wheel to secure the vehicle. Similarly, a high force may be required to dislodge the chock from the wheel because it may have become wedged tightly due to the vehicle being forced away from the loading dock during the loading operation. Also, a high force may be required to dislodge the chock from the stored position in winter conditions. Obviously, the requirement of high force and fast travel speed through a long distance can be met by a powerful drive mechanism. However, this significantly increases the cost of the drive components as well as the cost of electrical wiring to the drive unit.

SUMMARY OF INVENTION

This invention is related to co-pending U.S. patent application Ser. No. 08/350,132, filed on Nov. 29, 1994, entitled "Automatic Wheel Chock", commonly assigned with this application. That co-pending application deals with an automatic chock which engages the wheel of a transport vehicle to prevent it from moving away from a loading dock by having a chock move outward from the loading dock and then swing restraining elements into position once the proper location relative to a wheel is determined.

The automatic wheel chock is combined with a guide rail which carries the wheel chock and also acts to guide the wheels of the transport vehicle to position it relative to the loading dock. It can be used to engage a single wheel, or as one of a symmetrically opposite pair to engage a wheel on each side of the vehicle.

The automatic wheel chock of this invention has several advantages over existing devices. Because it is stored retracted against the dock face and approaches the trailer from the rear, it engages the rear-most set of wheels and is not affected by the number or position of other axles. Because it can be easily mounted to an existing driveway, the installation does not require the expense of excavation and concrete construction. Also, because it can rest on the surface of the driveway rather than in a pit, it does not require a drain. Furthermore, it is easily accessible for service, and can be easily detached and moved to a new location.

The operation of this invention is similar in concept to the device of Willey, U.S. Pat. No. 3,305,049 but uses a guide rail to provide three distinct advantages. The screw element is protected from impact and direct precipitation such as snow and freezing rain. The lateral and bending loads on the wheel chock are carried by the rail so that the screw carries only axial loads. Finally, the rail guides the wheels for better alignment of the vehicle to the loading dock and the wheel chock.

Additionally, in accordance with this invention a power system employs a multi-speed hydraulic or electric system. The system may be multi-speed in one or both directions, for the engagement of storing and driving the wheel chock. The choice of driving speed in this aspect of the invention is a function of resistance force encountered by the chock. When the resistance is low, high speed travel is accomplished and when the resistance exceeds a predetermined level, for example when the chock initially engages a wheel, the speed of travel in reduced to a low speed mode.

This invention will be described in greater detail by referring to the attached drawing and the description of the preferred embodiment that follows.

BRIEF DESCRIPTION OF THE DRAWING

FIG. 1 is a plan view, partially cut-away, of the first preferred embodiment of this invention illustrating the wheel chock in a retracted position;

FIG. 2 is a side view, partially cut-away, of the first preferred embodiment of this invention illustrating the wheel chock in a retracted position;

FIG. 3 is a front view of the first preferred embodiment of this invention position;

FIG. 4 is a detailed view of the chock assembly;

FIG. 18 is a plan view of a second preferred embodiment of this invention illustrating the chock retracted;

FIG. 19 is a side view of a second preferred embodiment of this invention illustrating the chock retracted;

FIG. 20 is a sectional view of track assembly of the second preferred embodiment;

FIG. 21 is a front view of carriage of the second preferred embodiment;

FIG. 22 is a top view of the chock partially extended in the second preferred embodiment;

FIG. 23 is a front view of the chock assembly engaged in the second preferred embodiment;

FIG. 24 is a plan view illustrating the chock engaged in the second preferred embodiment;

FIG. 25 is a side view illustrating the chock engaged in the second preferred embodiment;

DESCRIPTION OF THE FIRST PREFERRED EMBODIMENT

Figure 5:
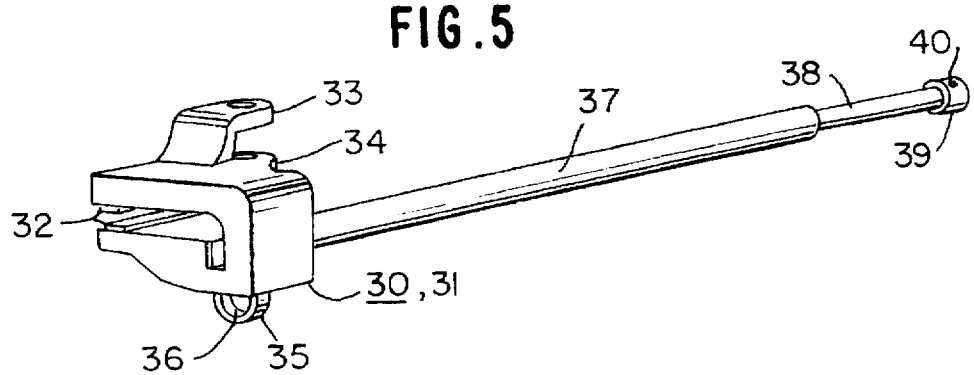
FIG. 5 is a detailed view of the carriage assembly.

Referring first to FIGS. 1 and 2, a plan view and side view respectively of a typical loading dock are depicted which has a driveway surface 1, a dock face 2 and a dock floor 3. Dock bumpers 5 limit the position of the transport vehicle 10 and protect the dock wall from impact damage. The vehicle 10 is shown for purposes of illustration with two axles each having wheels 11. It will be understood that the utilization of this invention is not in any way restricted by the wheel/ axle configuration of the vehicle to be retained. An automatic chocking device is shown with the chocks retracted in the stored position. In FIGS. 1 and 2 the chocking device is shown partially cut away to reveal the internal components.

FIG. 3 illustrates a front view of the guide rail 15. It is shown attached to the surface of the driveway by anchor bolts 16 and nuts 17. Alternately it may be welded to a steel plate which has been embedded in the concrete of the driveway. The technique of affixation is not critical to this invention so long as the guide rail is secured.

FIG. 4 illustrates the chock assembly 20 with an arm 21. One end of the arm 21 has a pivot hole 26, a sensor bar 23 and a control arm 24 with a pin 25. The other end has a chock plate 22 which contacts the front of the wheel of the vehicle 10 and a locking surface 27.

FIG. 5 illustrates the carriage assembly 30 for the chock assembly 20. A housing 31 is shaped to fit freely around the upper portion of the track 15 (see FIG. 2), and preferably has low friction bearing plates 32 fitted into internal recesses of the housing to reduce the friction when sliding along the track. Two mounting lugs 33 and 34, attached to the top of the housing, each have a vertical hole for mounting the chock assembly 20. A flange 35 with a hole 36 extends from the bottom of the housing 31. A bar 37 has one end attached to the housing and has at the other end a shaft 38. A collar 39 is attached to the end of the shaft 38 by means of a pin 40.

Figure 6:
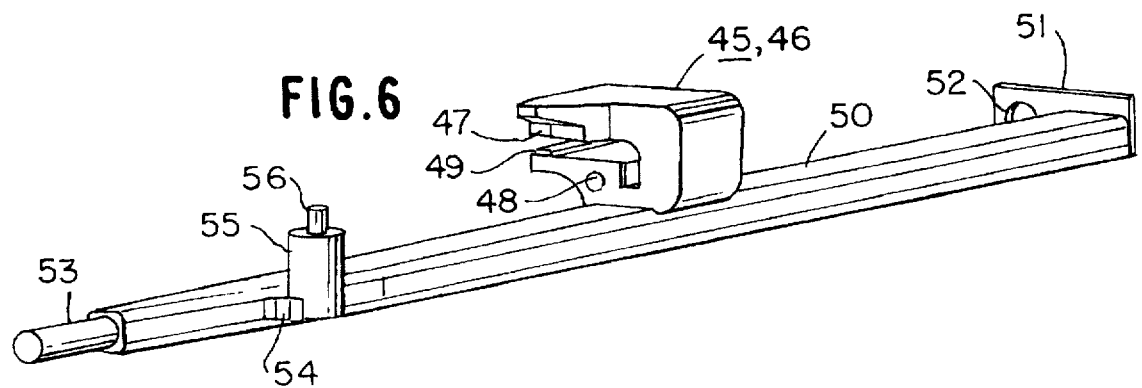
FIG. 6 is a detailed view of the lock assembly.

FIG. 6 illustrates the lock assembly 45. A housing 46 is shaped to fit freely around the upper portion of the track 15 (see FIGS. 2 and 3) and is attached to a bar 50. A locking cam surface 47 projects rearward from the top the housing and a hole 48 which passes through the lower part of the housing. The housing 46 has low friction bearing plates 49 fitted into internal recesses of the housing in a manner similar to those in the housing 31 of the carriage assembly 30. One end of the bar 50 has a plate 51 with a hole 52 to carry one end of a hydraulic cylinder 70 See FIG. 8). The other end has a shaft 53. Also attached to the bar 50 is a bracket 54, a boss 55 and a vertical pin 56.

Figure 7:
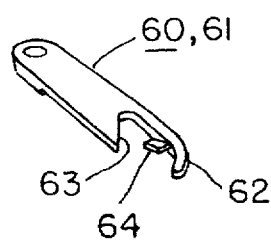
FIG. 7 is a detailed view of the latch assembly.

FIG. 7 illustrates a latch assembly 60 with a cam plate 61. The cam plate has an elongated curved cam surface 62 and a shorter angled cam surface 63. A latch plate 64 is attached to the elongated cam surface 62.

Figure 8:
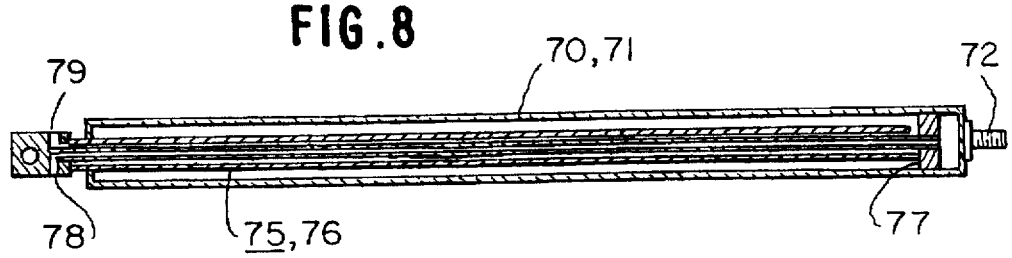
FIG. 8 is a sectional view of the hydraulic cylinder.

FIG. 8 illustrates the double acting hydraulic cylinder assembly 70 with a cylinder barrel 71 and a threaded mounting bolt 72. A rod assembly 75 has a rod 76 and a piston 77. The ports 78 and 79 are placed in the end of the rod 76 to eliminate external plumbing which would otherwise be required to both ends of a conventional cylinder. Fluid is carried to the cylinder from the ports through hollow passages in the cylinder rod. When hydraulic fluid is pumped in through the port 78, the pressure on the piston 77 causes the rod assembly 75 to extend, and when hydraulic fluid is pumped in through the port 79, the pressure on the rod side of the piston causes the rod assembly to retract. The rod assembly can be anchored by a pin 73 (see FIG. 9) through the hole in the end of the rod 76 and the cylinder barrel 71 will then move without any hoses being exposed.

The relationship of the components thus far discussed is shown in FIGS. 1, 2 and 3. The carriage assembly 30 and the lock assembly 45 are mounted on the rail assembly 15. The shaft 53 of the lock assembly 45 fits into the hole in the boss 35 of the carriage assembly 30, and the shaft 38 fits into the hole 48 in the lock assembly housing 46. Thus, the carriage assembly 30 and the lock assembly 45 are provided with resistance against lateral motion by the rail assembly 15, and are provided resistance against twisting motion by engagement with each other. The carriage assembly 30 and the lock assembly 45 have freedom of axial motion relative to each other limited by the housing 46 of the lock assembly being trapped between two shoulders on the shaft 38 formed by the bar 37 and the collar 39.

The chock assembly 20 is mounted between the lugs 33 and 34 of the carriage assembly 30 and pivots on a pin placed in hole 26. The latch assembly 60 pivots on the pin 56 of the lock assembly 45 and is held by a spring 57 (see FIG. 2). The latch assembly can rotate horizontally to any position about the vertical axis of the pin 56, but friction produced by the pressure of the spring 57 causes the latch assembly to maintain its position until it is moved by an external force. The latch assembly 60 also has freedom for limited vertically rotation away from the horizontal plane, but the pressure of the spring 57 forcing the plate 61 against the top of the boss 55 causes the latch assembly to return to the horizontal plane.

Figure 9:
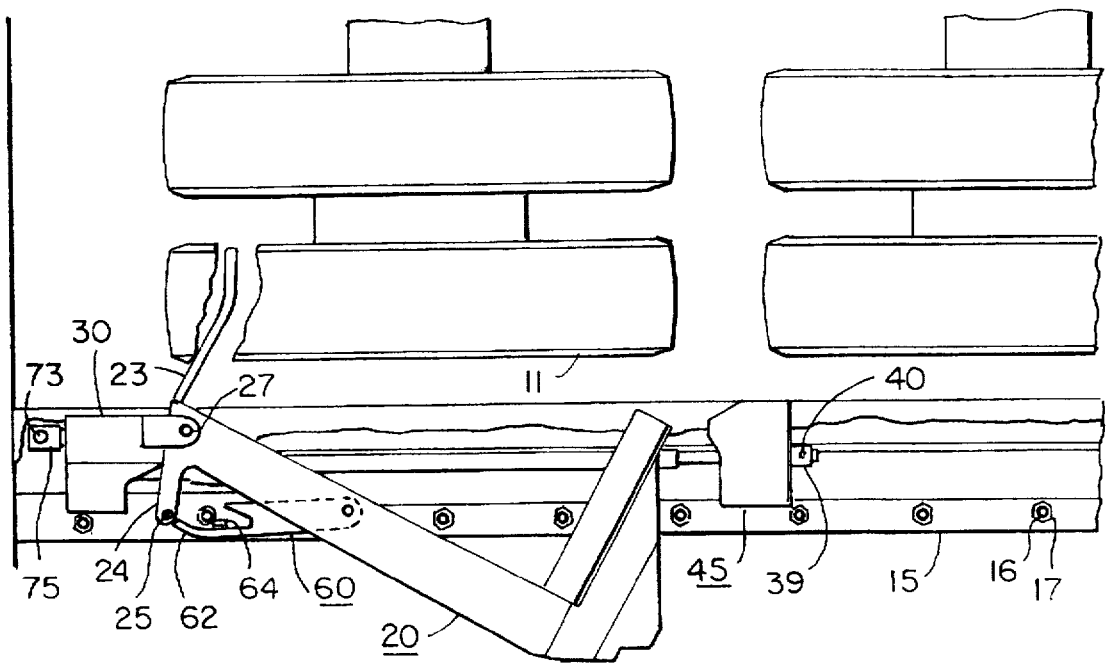
FIG. 9 is a plan view illustrating the cylinder extending as the wheel chock moves away from the wall.
Figure 10:
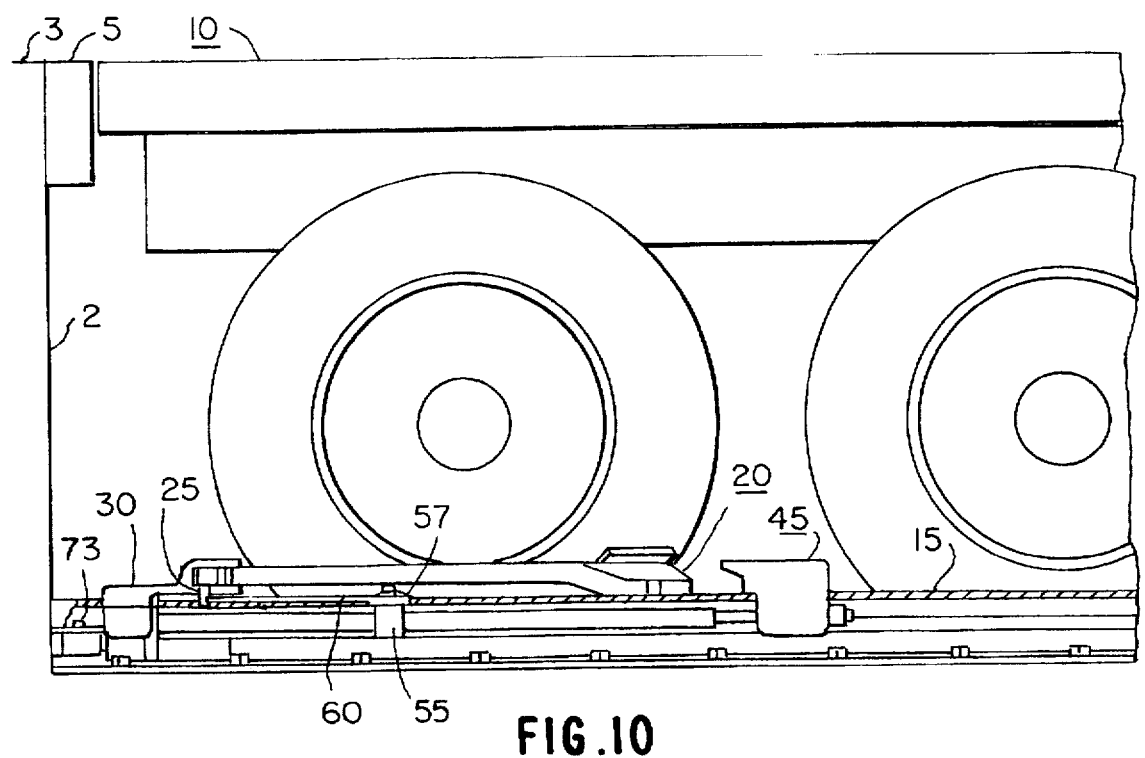
FIG. 10 is a side view illustrating the cylinder extending.

In operation, when no transport vehicle 10 is at the dock, the chock 20 is retracted outside of the vertical surface of the guide rail as shown on FIGS. 1 and 2. The carriage assembly is retracted toward the wall. When a vehicle 10 being backed up to the dock is not properly positioned to the dock, the outer rear wheel 11 will be guided by the vertical surface of the rail assembly 15. That is, the rail assembly 15 tends to guide to vehicle so that it is pre-positioned relative to the chock mechanism. When the chock device is actuated, hydraulic fluid is pumped from a hydraulic power unit (not shown) to the port 78 on the cylinder rod assembly 75 and causes the hydraulic cylinder 70 and the lock assembly 45 to be pushed forward away from the dock wall 2. As the lock assembly moves forward, the end of the cam surface 62 is deflected by the pin 56 and causes the latch assembly 60 to rotate counterclockwise as shown in FIG. 9. The latch assembly is held in the rotated position by the friction of the spring 57 (see FIG. 10).

Figure 11:
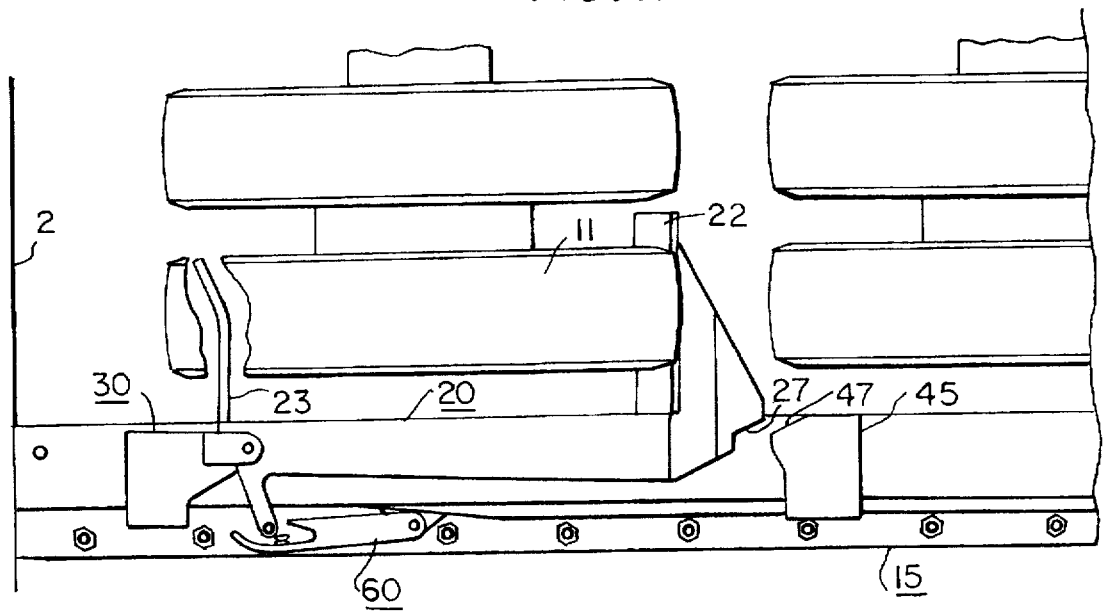
FIG. 11 is a plan view illustrating the chocks extended to engage a wheel.
Figure 12:
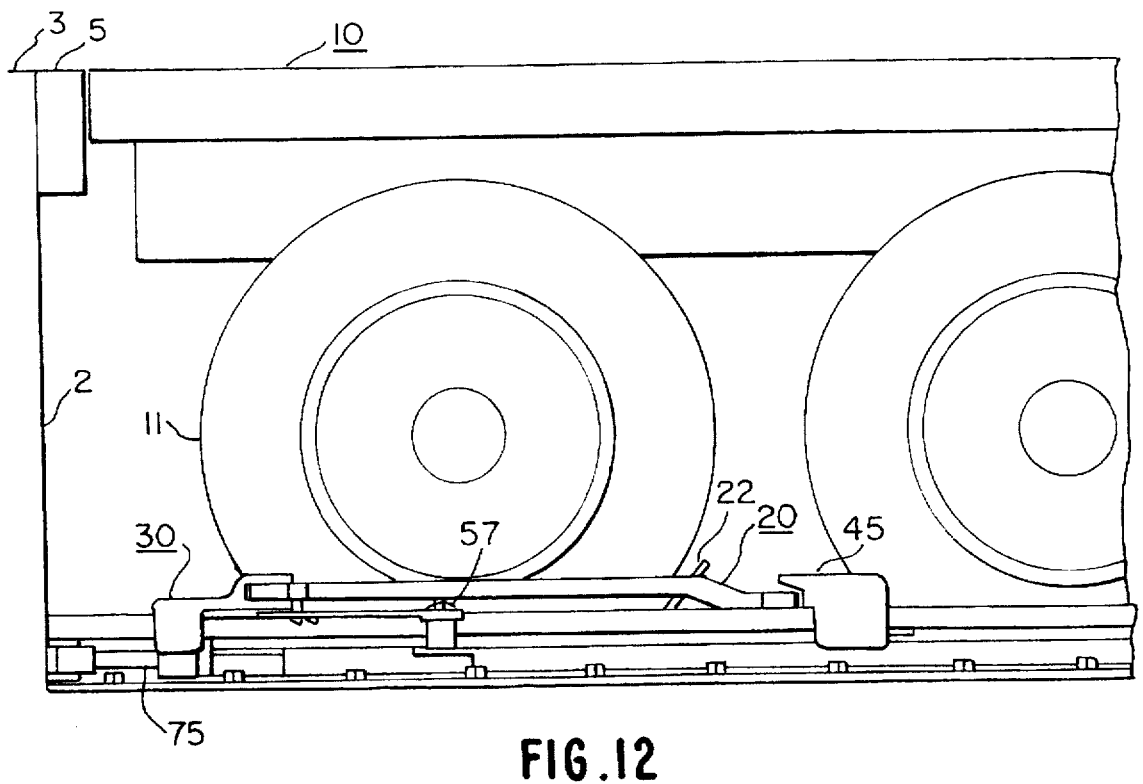
FIG. 12 is a side view illustrating the chocks extended to engage a wheel.

As the cylinder 70 extends, the housing 46 of the lock assembly contacts the collar 40 on the carriage assembly 30 and cause the carriage assembly to move forward. As the Carriage assembly 40 continues to move forward, the sensor bar 23 contacts the rear of the wheel 11 and the chock 20 extends in front of the outer rear wheel as shown in FIGS. 11 and 12. When the chock is fully extended, the sensor bar 23 will be forced against the back of the tire and the carriage assembly 30 and lock assembly 45 will be prevented from moving. The hydraulic pressure will increase and will be sensed by an electrical pressure switch or by a spring sequence valve (not shown), both of which are well known in the loading dock industry. The power unit will then direct hydraulic fluid through the port 79 to the rod side of the cylinder 71 and cause the cylinder 70 to retract. The lock assembly 45 will then move rearward. The locking surface 47 of the lock assembly will engage the locking surface 27 of the chock assembly 20 and the chock assembly 20 will be locked in the extended position as shown on FIGS. 13 and 14. The carriage assembly 30 will continue to move rearward until the chock surface 22 is held firmly against the wheel 11 preventing the vehicle 10 from moving. The pressure switch will then sense the increase in pressure and cause the power unit to stop and the vehicle 10 will be secured.

Figure 13:
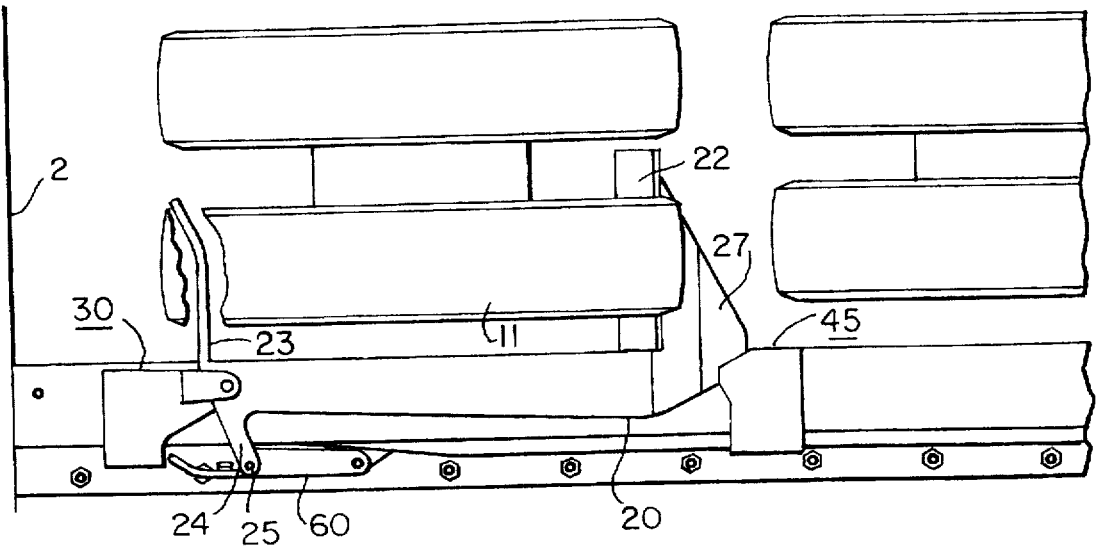
FIG. 13 is a plan view illustrating the chocks locked and engaging a wheel to restrain a vehicle.
Figure 14:
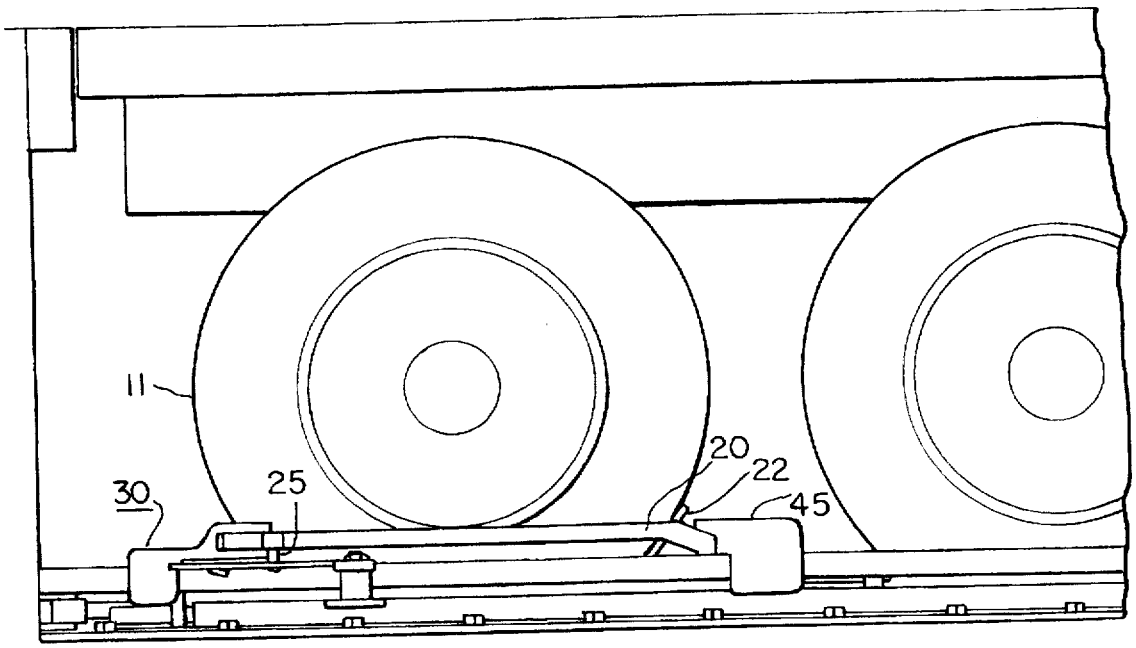
FIG. 14 is a side view illustrating the chocks locked and engaging a wheel to restrain vehicle.

FIGS. 13 and 14 illustrate the chock engaging the front of the wheel 11. Also, the cam surface 63 of the latch assembly 60 will engage the pin 25 and cause the latch assembly to rotate clockwise to the initial position as shown in FIG. 13.

Figure 15:
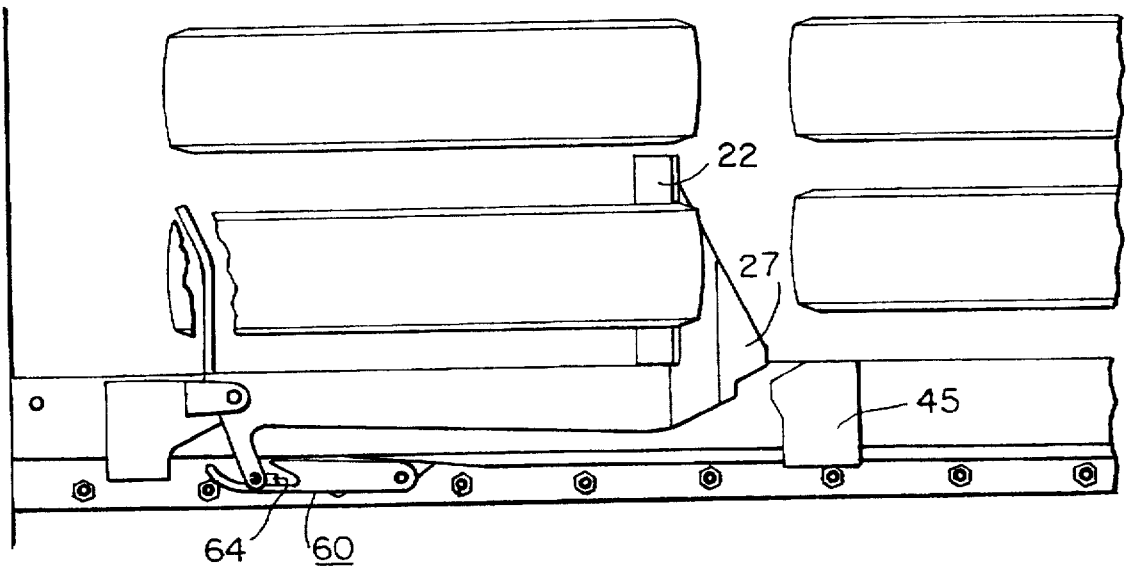
FIG. 15 is a plan view illustrating the latch re-setting.
Figure 16:
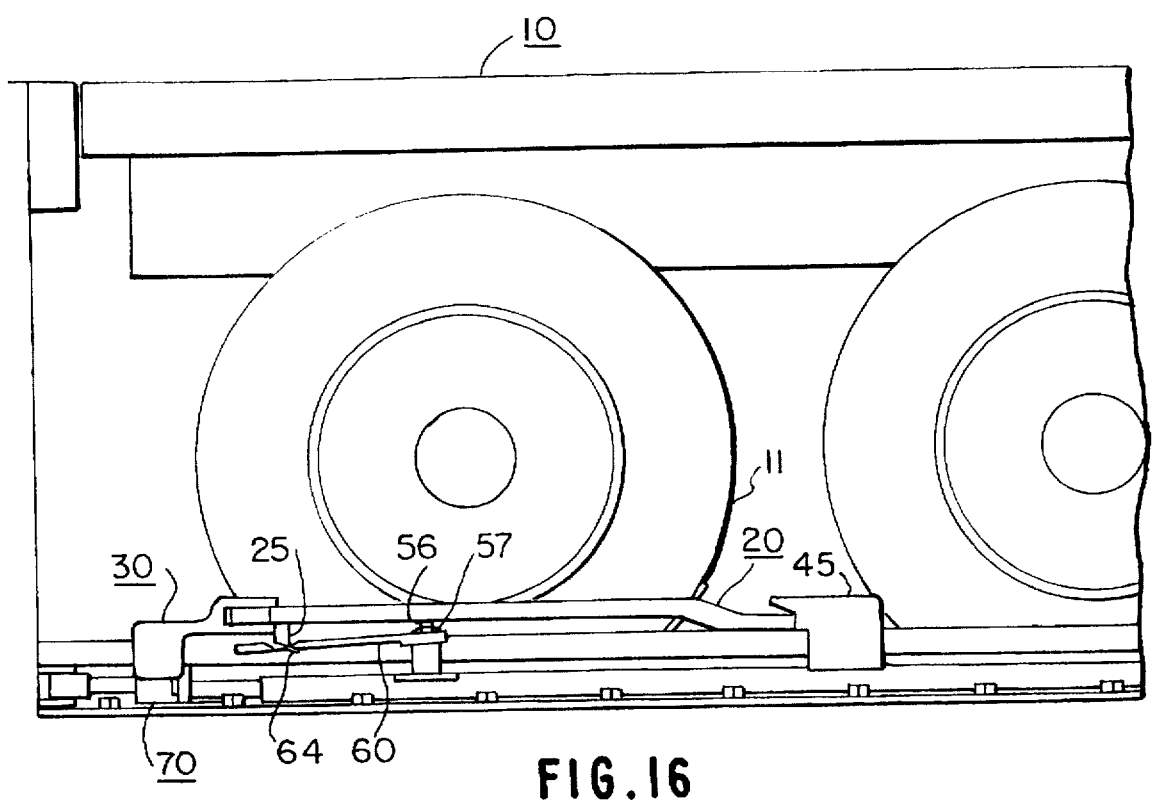
FIG. 16 is a side view illustrating the latch re-setting.

When the loading operation is completed and the vehicle is to be released, the hydraulic cylinder 70 is extended. The lock assembly 45 moves forward and releases the locking surface 27 of the chock assembly 20 as illustrated in FIGS. 15 and 16. As the lock assembly moves forward the angled latch plate 64 of the latch assembly 60 is deflected downward by the lower end of the pin 25 on the chock assembly 20. This is shown in FIG. 16 where a portion of the latch assembly 60 is cut away to show the latch plate 64 and the pin 25. When the lock assembly moves fully forward the latch plate 64 will pass under the pin 25 and the spring 57 will cause the latch assembly to rotate back to the horizontal plane with the latch plate positioned in front of the pin 25.

The lock assembly 45 will move the carriage assembly 30 forward until the sensor bar 23 again contacts the rear of the wheel 12 and the pressure switch will then cause a valve to shift and the hydraulic cylinder 70 to retract. The latch bar 64 will engage the front of the pin 25, preventing the lock assembly 45 from moving closer to the carriage assembly to engage the locking surface 27 of the chock 20, and also urging the chock assembly 20 to rotate clockwise to the retracted position shown in FIG. 1. When the carriage assembly is fully retracted toward the wall 3, the pressure switch will sense the increase in hydraulic pressure and cause the power unit to stop with the chock in the stored position. Also, a limit switch may be mounted at the end of the track assembly 15 to sense when the carriage assembly 30 is fully retracted.

While a hydraulic cylinder is shown, the chocking device of this invention could be powered by other means such as an electric motor driving a screw, or chain and sprockets. Also, there other possible configurations of the latch which controls the locking and release of the chock assemblies. This chocking device could be used alone, or in pairs to chock the wheels on both sides of the vehicle.

Figure 17:
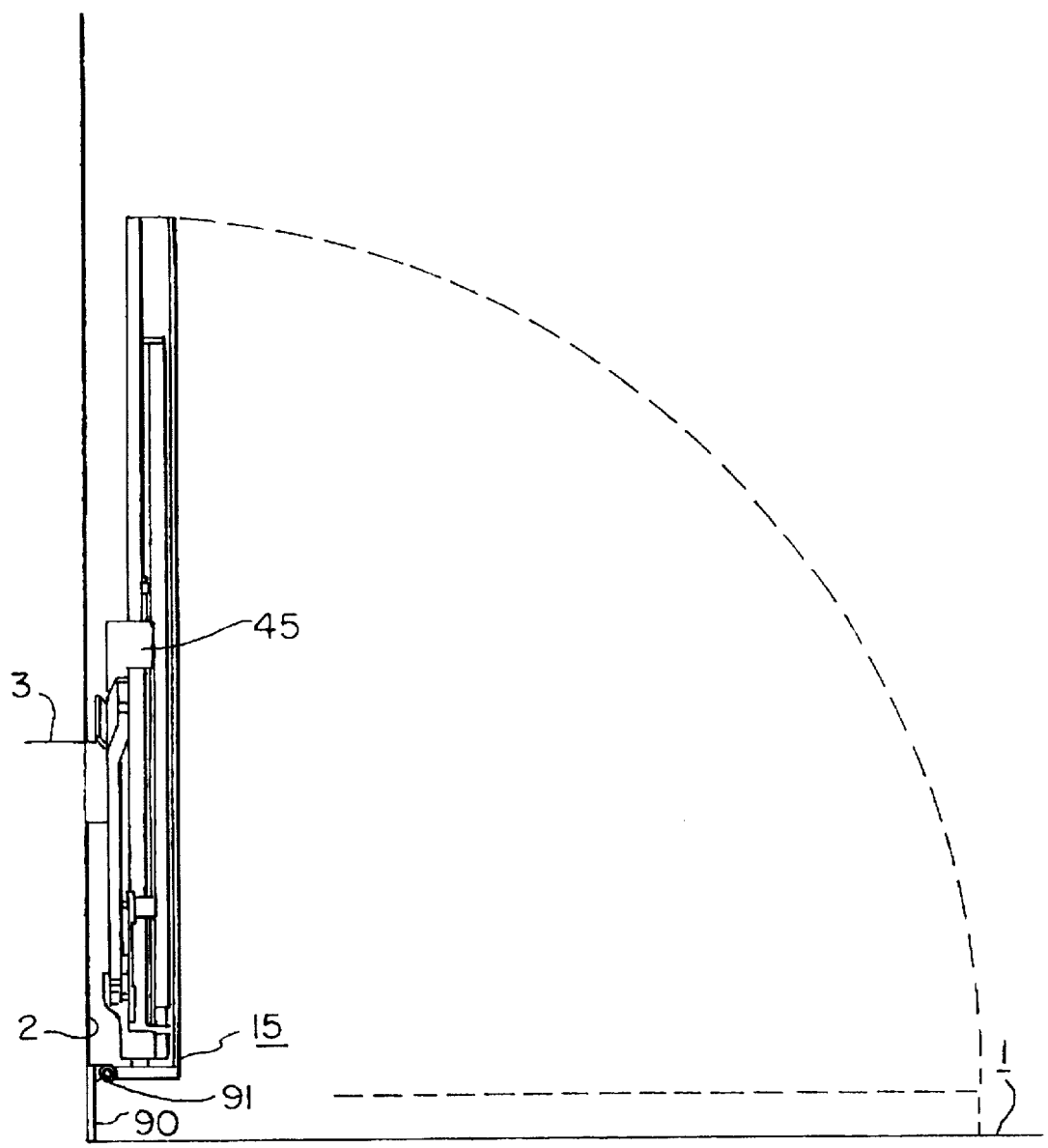
FIG. 17 is a view of an alternate guide rail mounting for the first preferred embodiment of this invention.

FIG. 17 shows an alternate mounting configuration where the guide rail assembly 15 is shown attached by a horizontal pin 91 to a mounting bracket 90 which is secured to the driveway 1 or the building wall 2. The guide rail and wheel chock mechanism can thus be raised as shown to allow removal of snow or debris from the driveway.

DESCRIPTION OF THE SECOND PREFERRED EMBODIMENT

FIGS. 18 and 19 illustrate a plan view and side view respectively of a typical loading dock which has a driveway surface 1, a dock face 2 and a dock floor 3 with the second preferred embodiment in place. Dock bumpers 5 limit the position of the transport vehicle 10 and protect the dock wall from impact damage. The vehicle 10 is shown with two axles each having wheels 11. An automatic chocking device of the second preferred embodiment is shown with the chocks retracted in the stored position.

The guide rail assembly 220 is attached to the driveway surface 1. As shown on FIG. 20, the track assembly has a structural member 221 with a vertical surface 222 to guide the wheels 11 of the vehicle. A bar 223 attached to the structural member acts as a guide rail for the carriage assembly 240. Several base plates 224 are attached to the driveway surface 1 using anchor bolts 228. Alternatively the base plates 224 may be welded to plates embedded in the driveway 1. This is consistent with the first preferred embodiment. The base plates 224 are welded to spacer bars 225 which are welded to the bottom of the structural member 221. The spacers elevate the bottom of the guide rail assembly above the driveway to allow adequate drainage under the rail and also strengthen the base plates 224. The guide rail assembly 220 also has two plates 226 and 227 which carry the rotating screw 230 on bearings 231 and 232. The shaft is coupled to an electric motor 233.

As shown on FIGS. 18 and 19 the carriage assembly 240 has two housings 241 and 242 which are joined by a bar 243. As shown in FIG. 21 the housings 241 and 242 are shaped to fit freely around the bar 223 of the guide rail assembly 220 and preferably have low friction bearing plates 245 and 246 fitted into internal recesses of the housings to reduce the friction when sliding along the bar 223. Two mounting plates 247 and 248 are attached to the front housing assembly 241 and carry a pin 215. A plate 249 is fastened to the rear housing assembly 242 and carries a nut assembly 235 which engages the rotating screw 230.

FIG. 22 illustrates a wheel chock assembly 250 having a chock plate 251, a base plate 252 and support plate 253. A bearing plate 254 is attached to the side of the support plate 253. An arm 255 couples the chock assembly 250 to the carriage assembly 240 by the pin 215. A stop block 256 (see FIG. 23) is mounted on the top of the arm 254 and a pin 257 extends below the arm 253 and engages the cam plate 260 which is attached to the top of the bar 223 by the bolts 265. The cam plate 260 has a front cam surface 261 and a rear cam surface 262 as shown in FIG. 22. As shown in FIGS. 18 and 19 a tapered guide assembly 270 is attached to the driveway 1 in front of the guide rail assembly 220 to protect the chock assembly 250 and assist in aligning the vehicle 10.

In operation, when no transport vehicle is at the dock, the chock assembly 250 is rotated in front of the guide rail assembly 220 as shown on FIGS. 18 and 19. When a vehicle 10 being backed up to the dock is not properly positioned to the dock, the outer rear wheel 11 will be guided by the guide assembly 270 and the vertical surface 222 of the rail assembly 220. When the chock device is actuated, the screw 230 rotates and causes the carriage assembly 240 and the chock assembly 50 to be pulled toward the dock wall 2. As the chock assembly 250 moves, the pin 257 engages the cam surface 262 and causes the chock assembly 250 to rotate as shown in FIG. 22.

When the chock assembly has fully rotated to the extended position it continues to move rearward and is held extended by the plate 254 bearing against the outer surface 222 of the guide rail assembly 220. The chock assembly 250 is prevented by rotating beyond the extended position by the block 256 contacting the side of the plate 247 as shown in FIG. 24. As the screw 230 continues to rotate the chock assembly 250 is moved against the front of the wheel 11 as shown in FIGS. 24 and 25. As the chock assembly 250 is forced against the tire 11, the torque exerted on the screw 230 will increase. The increased electrical current drawn by the motor 233 is measured and used to shut off the motor.

When the loading operation is completed and the vehicle 10 is to be released, the screw 230 rotates in the opposite direction and moves the wheel chock assembly 250 forward. The pin 257 engages the cam surface 261 as shown in FIG. 22 and causes the chock assembly 250 to rotate to the stored position shown in FIGS. 18 and 19. When the chock assembly 250 is fully retracted it activates a limit switch (not shown) which stops the motor.

While an electric motor is shown driving the screw, this chocking device could be powered by other means such as a hydraulic motor driving a screw, a hydraulic cylinder, as in the first preferred embodiment, or chain and sprockets. Also other means may be used to sense the load on the rotating screw 230 such as measuring the hydraulic pressure of an hydraulic motor.

Alternatively, a pressure sensing switch may be placed between the bearing 232 and the plate 227 to sense the axial load on the screw 230. Other configurations of the guide rail can be used to achieve the same result. Also, this chocking device could be used alone to engage a single wheel, or as one of a symmetrically opposite pair to engage a wheel on each side of the vehicle.

DESCRIPTION OF A PREFERRED MULTI-SPEED DRIVE SYSTEM

Another aspect of this invention is the use of a multi-speed drive system which provides high travel speed when the resistance force is low, and low travel speed when the force exceeds an adjustable predetermined level. The result is a drive system which has significantly faster engagement speed yet has a low power requirement.

The drive mechanism can have many configurations. The following description cover hydraulic and electrical drives for an automatic chocking mechanism as described in the first and second preferred embodiments. The same result can be achieved using mechanical gear trains with automatic clutch mechanisms, but such devices are usually not cost effective.

Figure 26:
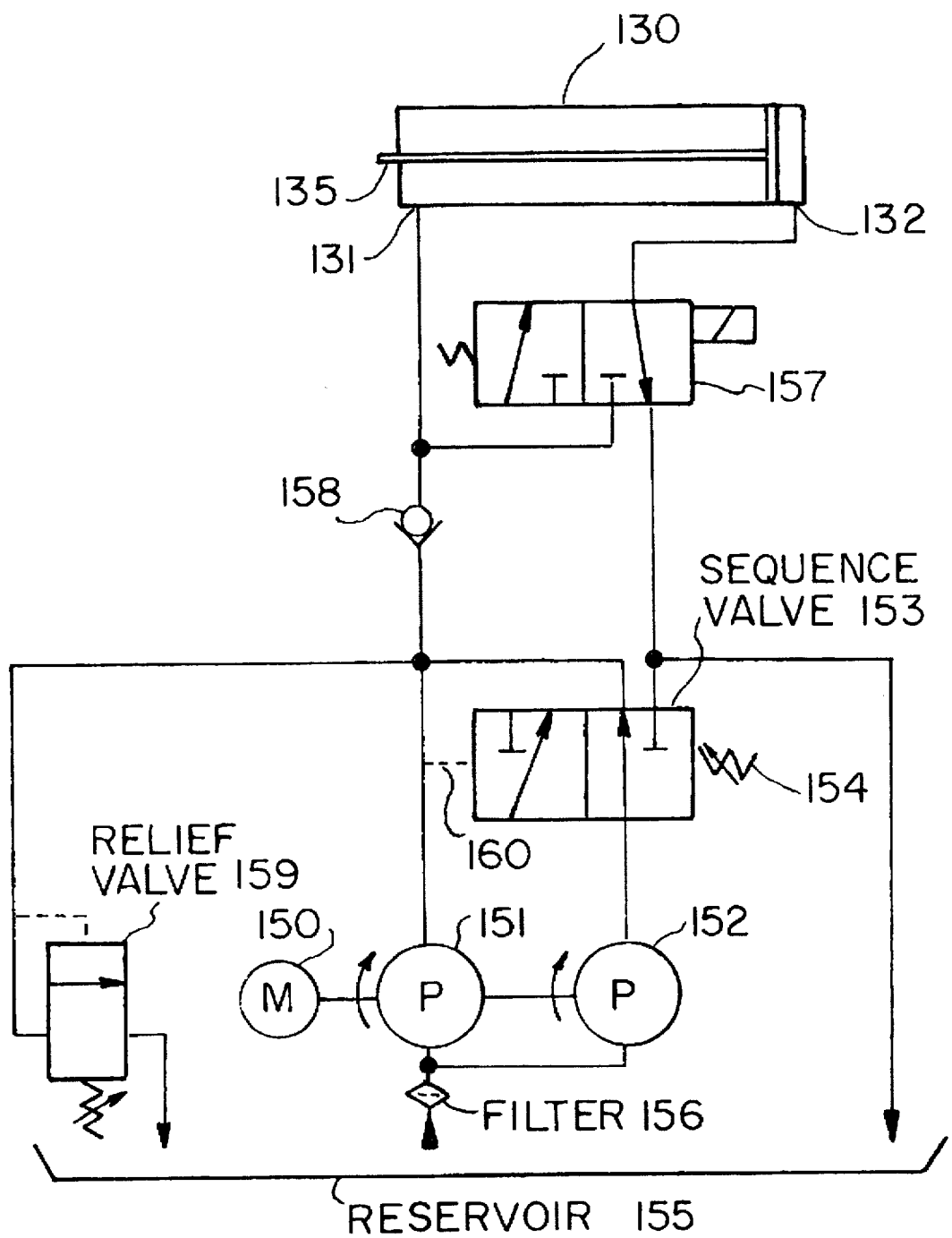
FIG. 26 is a schematic drawing of a hydraulic drive system with two speeds in each direction.

The chocking device illustrated in FIGS. 1–17 is powered by a hydraulic system shown schematically in FIG. 26. The power unit has a motor 150, two pump stages 151 and 152 and a sequence valve 153 which has an adjustable spring 154. Hydraulic fluid is held in the reservoir 155 and drawn through a filter 156. Output of the primary stage pump 151 is directed to a four-way valve 157. The valve 157 directs fluid to the port 131 of the hydraulic cylinder 130 to extend the cylinder rod 135, and can be shifted to direct fluid to the port 132 to retract the rod. The hydraulic cylinder 130 is illustrated in schematic form, it being understood that the specific configuration may be that illustrated in FIG. 8. Thus the lines 131 and 132 would be coupled to ports 78 and 79.

The check valve 158 prevents flow of fluid back to the reservoir and a relief valve 159 protects the system by limiting the maximum pressure. The fluid from the second stage pump 152 flows through the sequence valve and is normally directed to the hydraulic cylinder with the fluid from the primary stage pump 151. When the resistance to movement is low, the pressure is low and the output of both pumps is directed to the cylinder 130 and the travel speed is high. If the chock device meets higher resistance, the pressure of the fluid in the cylinder will increase. The pressure is transmitted to the sequence valve by the pilot line 160 and the sequence valve shifts to direct the fluid from the second stage pump 152 to the reservoir 155 at very low pressure, and the output of only the primary stage pump 151 is directed to the hydraulic cylinder 130. Because the flow is reduced, the motor 150 can generate much higher fluid pressure with no increase in power. The result is that the chock device usually operates at high speed with low force.

When the force increases, the speed decreases and the total power requirement remains low. The ratio of the pressures generated at high and low speeds can be varied by changing the relative displacements of the primary and secondary stages of the pump. The preferred ratio would be determined by comparing the maximum force required to move the chock device to and from the stored position, and the maximum force required to engage or disengage the chock with the wheel of the vehicle.

Also, this drive system of the invention is not limited to two speeds. While additional costs would be incurred to add a third stage pump and a second sequence valve, there may be some conditions such as moving through snow where an intermediate speed would be justified.

Figure 27:
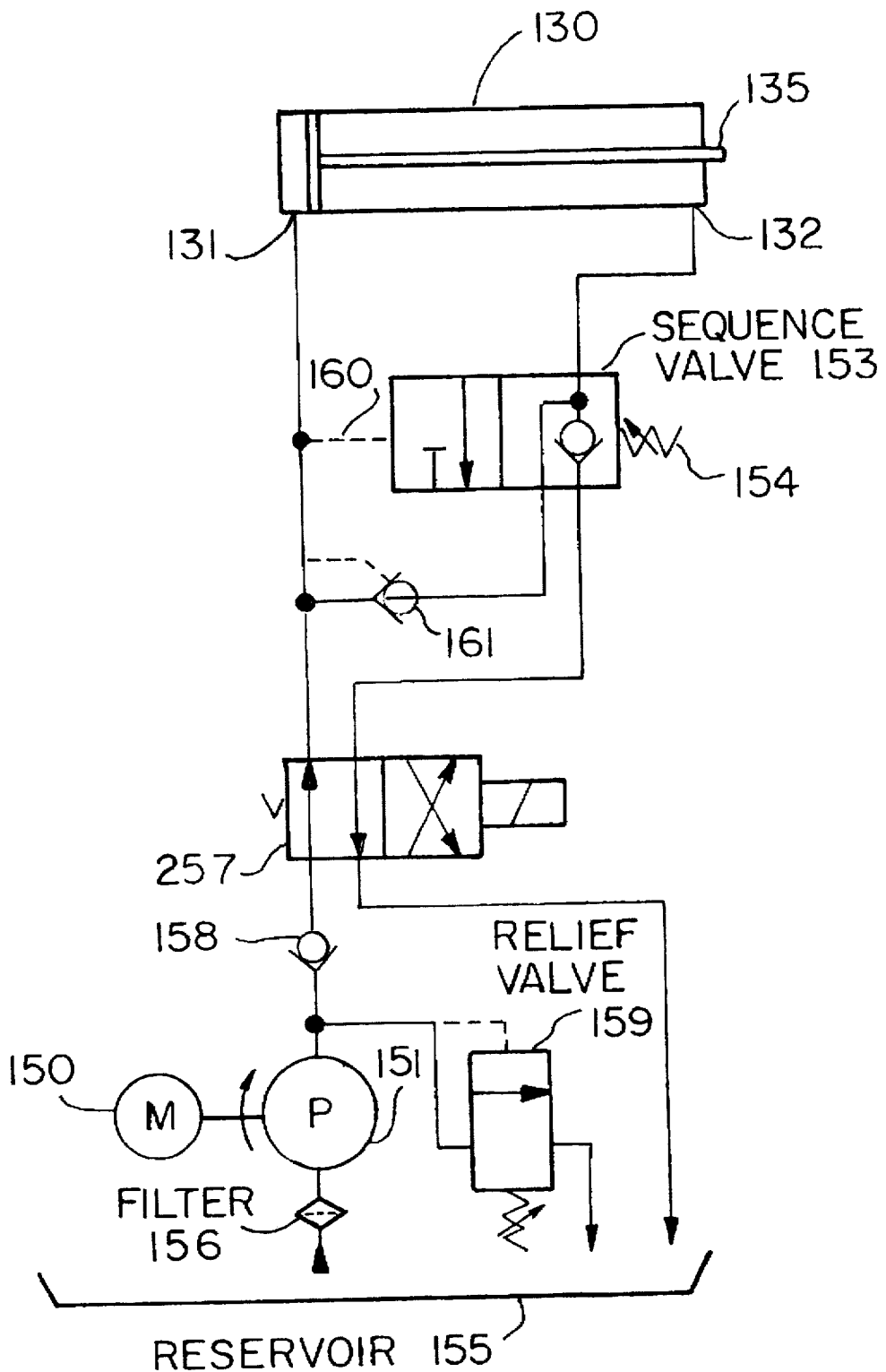
FIG. 27 is a schematic drawing of a hydraulic drive system with two speeds in only one direction.

FIG. 27 illustrates a simplified hydraulic method which can be used with a single pump to provide two speeds to extend the cylinder but not to retract it. Like components in FIG. 27 are numbered similarly to FIG. 26. Fluid from the pump 151 is normally directed to both ends of the double acting cylinder 130, causing the cylinder rod 135 to extend at a speed proportional to the volume of flow produced by the pump and the area of the cylinder rod. This type of hydraulic circuit is commonly known as "regenerative" because the volume of fluid entering the port 131 of the cylinder is the sum of the volume from the pump and the volume forced from the rod end of the cylinder through port 132. If the pressure in the cylinder exceeds the force of the spring 154, the sequence valve 153 shifts to connect the port 132 to the reservoir and the pump flow is directed only to the piston end of the cylinder. Thus the speed of extension is reduced but the force is increased by the ratio of the diameters of the piston and the rod.

The cylinder is retracted by shifting the valve 357 to direct fluid to the port 132, but only one retract speed is possible. The pilot operated check valve 161 is opened by pressure in the line to port 131 and prevents fluid flow from port 132 to the reservoir when the cylinder is retracting.

The first preferred embodiment of FIGS. 1–17 is shown with a hydraulic cylinder, but could also use a powered screw device or linear actuator as shown in U.S. Pat. No. 5,249,905. Any such drive mechanism requires a motor to provide motion. If powered by a hydraulic motor, the hydraulic circuit shown in FIG. 26 could be used.

Figure 28:
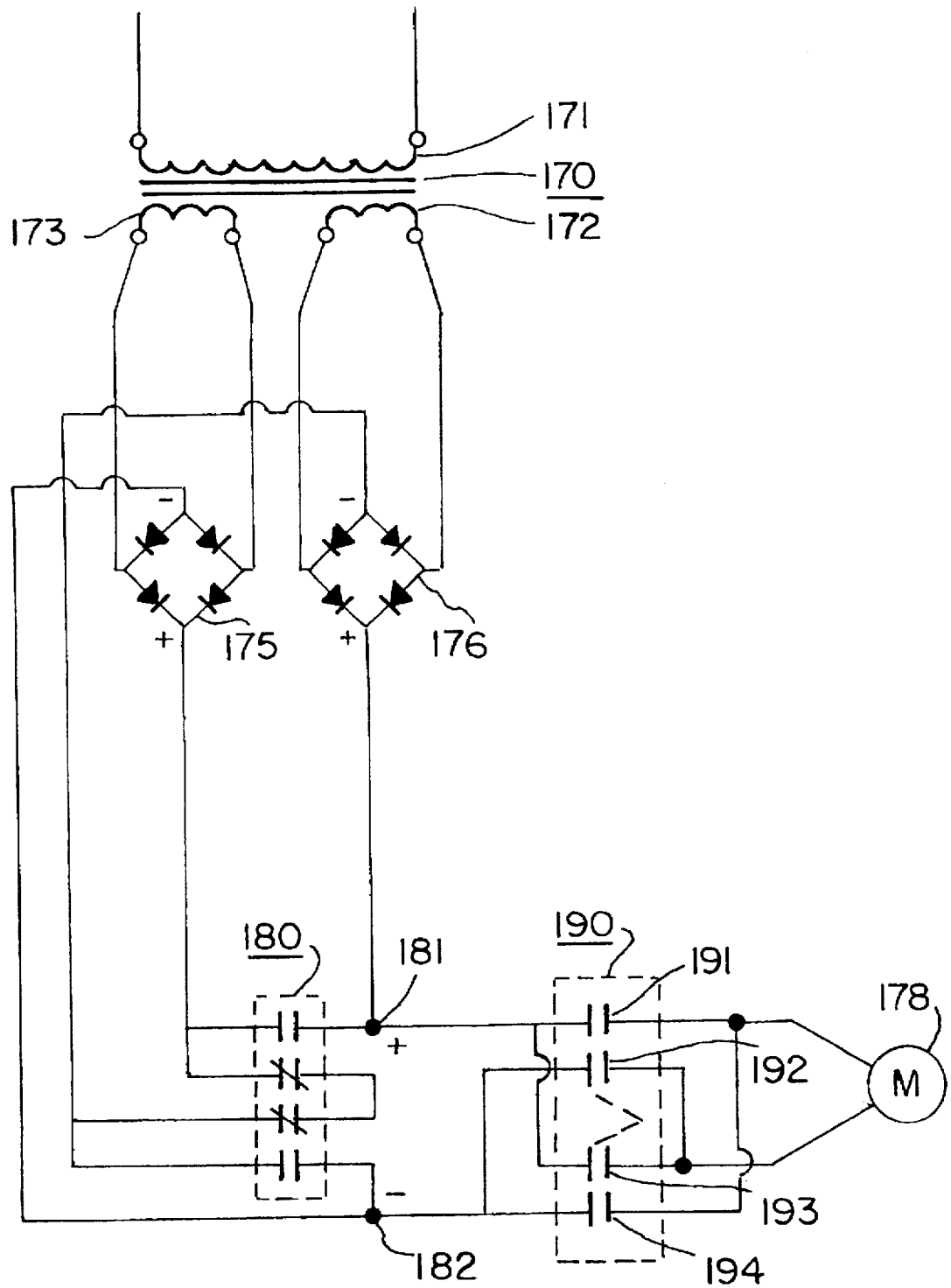
FIG. 28 is a schematic drawing of an electric drive system with two speeds in each direction.

If driven by an electric motor, the speed and torque characteristics could be controlled to provide similar power characteristics. This is illustrated in FIG. 28. A direct current (DC) electric motor has a speed proportional to voltage. A dual power supply can be connected in series to provide high voltage / low current for high speed, or in parallel for low voltage / high current for higher torque at a lower speed. FIG. 28 shows a transformer 170 with a primary winding 171 connected to a suitable power source, and two secondary windings 172 and 173. If the secondary windings 172 and 173 have an equal number of turns, then each will produce the same voltage. Each secondary winding is connected to bridge rectifiers 175 and 176 to change the alternating current (AC) of the transformer to direct current (DC) for the motor 178. A relay 180 normally connects the output of the rectifiers 175 and 176 in series so that the voltage at terminals 181 is the sum of the voltage at each rectifier. When the relay 180 is switched, the closed contacts open and the open contacts close to connect the output of both rectifiers in parallel. This reduces the voltage by half, but doubles the current for greater torque and does not increase the total power requirement of the system.

A reversing relay 190 is used to control the motor 178. To operate the motor rotating in one direction contacts 191 and 192 are closed, and to reverse the motor, contacts 193 and 194 are closed. A mechanical interlock prevents simultaneous closing of both sets of contacts.

The motor 178 normally runs in a high speed, low torque mode. A sensor (not shown) is used to determine the load on the drive mechanism and automatically switch the relay 80 to cause the motor 178 to operate in a low speed / high torque mode when the load on the drive mechanism reaches a predetermined level. The sensor may detect a change in axial load on the screw, shaft torque, electrical current or any other characteristic which indicates the force generated by the drive mechanism.

Although a powered screw device is commonly used as an alternative to a hydraulic cylinder, the drive means described are also applicable to other mechanical devices such as a chain and sprockets, cable and pulleys, rack and pinion, etc. Also, the same result can be achieved using a mechanical gear box with automatic shifting, but the cost is usually not competitive.

While two preferred embodiments are illustrated together with a preferred power system, it is apparent that modifications of this portion of the disclosure may be practiced within the scope of this invention. It is also apparent that modifications of the various embodiments of the chocking embodiments may be practiced within the scope of this invention.

I claim:

1. A chocking device for securing a vehicle at a loading dock comprising:

a guide rail mountable to a driveway, a carriage movable on said guide rail and a drive mechanism to advance said carriage from a stored position to a position proximate to a wheel of said vehicle;

a chock assembly pivotally mounted on said carriage, said chock assembly movable by said drive mechanism from a retracted position to an engaging position and said chock assembly comprising, an arm having a sensor bar to contact one portion of said wheel and a chock plate movable in response to contact of said sensor bar against said wheel to contact another portion of said wheel and block movement of said vehicle; and, a lock assembly mounted on said guide rail for movement thereon, said lock assembly movable by said drive mechanism into contact with said chock plate to restrain said chock plate in said engaging position.

2. The chocking device of claim 1 further comprising; a latch assembly mounted to said lock assembly and engaging said arm to move said chock plate into said retracted position.

3. The chocking device of claim 1 wherein said drive mechanism comprises a double acting hydraulic cylinder for extending said lock assembly and said carriage when said cylinder moves in a first direction and for moving said lock assembly when said cylinder moves in a second direction.

4. The chocking device of claim 3 further comprising means to sense an increase in force as said sensor bar moves into contact with said wheel and a power unit responsive to said means to sense said increase in force to reverse the direction of movement of said hydraulic cylinder to move said lock assembly into contact with said chock plate.

5. The chocking device of claim 1 wherein said drive mechanism comprises an electric motor for moving said carriage and said lock assembly.

6. The chocking device of claim 1 further comprising a mounting bracket for said guide rail, a pivotable coupling between said mounting bracket and said guide rail, whereby said guide rail can rotate to be raised above said driveway.

7. The chocking device of claim 1 wherein said drive mechanism comprises a double acting cylinder and a piston rod, said drive mechanism connected to said lock assembly and said carriage, a power unit coupled to said cylinder, said power unit comprising a motor driving two pump stages, a sequence valve coupled to one stage and a multi port valve coupled to said sequence valve, one of said pump stages connected to said piston rod and the other of said pump stages selectively gated to said piston rod or to a drain by said sequence valve, said sequence valve sensing increase in system pressure to gate the output of said other of said pump stages thereby reducing the speed of extension of said piston rod.

8. The chocking device of claim 1 wherein said drive mechanism comprises a double acting cylinder and a piston rod, said drive mechanism connected to said lock assembly and said carriage, a power unit coupled to said cylinder, said power unit comprising a motor driving a single pump, a multi port valve coupled to said motor to deliver the output thereof to one end of said piston rod to extend the rod, a sequence valve connected to said piston rod for retracting said rod and the multi port valve, said sequence valve sensing increase in system force to gate the output of said pump to a drain and thereby reduce the speed of extension of said rod.

9. The chocking device of claim 1 wherein said chock plate has a notch and said lock assembly has a projection engaging said notch to lock said chock plate in a position engaging said wheel and preventing movement of said vehicle.

10. The chocking device of claim 1 further comprising an extension on said chock assembly projecting opposite from said sensor bar, a latch assembly mounted on said lock assembly for engaging said extension for withdrawing said chock plate from an engaging position with said wheel.

11. A chocking device for securing a vehicle at a loading dock comprising:

a guide rail mountable to a driveway, a carriage movable on said guide rail and a drive mechanism extending along said guide rail to advance said carriage from a stored position to a position proximate to a wheel of said vehicle;

a chock assembly pivotally mounted on said carriage, said chock assembly movable by said drive mechanism from a retracted position to an engaging position and comprising, a chock plate movable in response to said drive mechanism to an engaging position against said wheel for blocking movement of said vehicle;

a lock assembly mounted on said guide rail for movement thereon, said lock assembly movable by said drive mechanism into contact with said chock assembly to restrain said chock plate in said engaging position; and, means to sense an increase in pressure as said carriage moves said chock plate into said engaging position to alter operation of said drive mechanism.

12. The chocking device of claim 11 further comprising a sensor arm coupled to said chock assembly to determine the presence of a wheel, a latch assembly mounted to said lock assembly and engaging said arm to lock said sensor arm into contact with said wheel.

13. The chocking device of claim 12 further comprising a power unit responsive to said means to sense said increase in pressure to reverse the direction of movement of said hydraulic cylinder to move said lock assembly into contact with said chock plate.

14. The chocking device of claim 11 wherein said drive mechanism comprises a double acting hydraulic cylinder for extending said lock assembly and said carriage when said cylinder moves in a first direction and for moving said lock assembly when said cylinder moves in a second direction.

15. The chocking device of claim 11 wherein said drive mechanism comprises an electric motor and a lead screw, said carriage operably coupled to said leadscrew for moving said carriage and said lock assembly.

16. The chocking device of claim 15 wherein said means to sense comprises means to sense a force on said lead screw to terminate power to said electric motor.

17. The chocking device of claim 11 wherein said drive mechanism comprises a double acting cylinder and a piston rod, said drive mechanism connected to said lock assembly and said carriage, a power unit coupled to said cylinder, said power unit comprising a motor driving two pump stages, a sequence valve coupled to one stage and a multi port valve coupled to said sequence valve, one of said pump stages connected to said piston rod and the other of said pump stages selectively gated to said piston rod or to a drain by said sequence valve, said sequence valve sensing increase in system force to gate the output of said other of said pump stages thereby reducing the speed of extension of said piston rod.

18. The chocking device of claim 11 wherein said drive mechanism comprises a double acting cylinder and a piston rod, said drive mechanism connected to said lock assembly and said carriage, a power unit coupled to said cylinder, said power unit comprising a motor driving a single pump, a multi port valve coupled to said motor to deliver the output thereof to one end of said piston rod to extend the rod, a sequence valve connected to said piston rod for retracting said rod and the multi port valve, said sequence valve sensing increase in system force to gate the output of said pump to a drain and thereby reduce the speed of extension of said rod.

19. The chocking device of claim 11 wherein said chock plate has a notch and said lock assembly has a projection engaging said notch to lock said chock plate in a position engaging said wheel and preventing movement of said vehicle.

\* \* \* \* \*